(12) United States Patent
Voss

(10) Patent No.: US 7,766,067 B2
(45) Date of Patent: *Aug. 3, 2010

(54) ROTARY ULTRASONIC SEALER

(75) Inventor: Brian Voss, Kolding (DK)

(73) Assignee: 3-L Ludvigsen A/S, Tommerup (DK)

( * ) Notice: Subject to any disclaimer, the term of this patent is extended or adjusted under 35 U.S.C. 154(b) by 0 days.

This patent is subject to a terminal disclaimer.

(21) Appl. No.: 12/311,340

(22) PCT Filed: Sep. 26, 2007

(86) PCT No.: PCT/DK2007/000417

§ 371 (c)(1),
(2), (4) Date: Mar. 27, 2009

(87) PCT Pub. No.: WO2008/037256

PCT Pub. Date: Apr. 3, 2008

(65) Prior Publication Data

US 2009/0289528 A1    Nov. 26, 2009

(30) Foreign Application Priority Data

Sep. 28, 2006 (DK) .............................. 2006 01258

(51) Int. Cl.
*B32B 37/00* (2006.01)

(52) U.S. Cl. ................... 156/580.2; 156/73.1; 156/555; 156/582

(58) Field of Classification Search ............... 156/73.1, 156/228, 555, 580.1, 580.2, 582; 264/442, 264/443, 444, 445; 228/1.1, 110.1; 425/174.2; 310/321, 323.01, 323.18, 348, 351
See application file for complete search history.

(56) References Cited

U.S. PATENT DOCUMENTS 5,096,532 A * 3/1992 Neuwirth et al. ......... 156/580.1

(Continued)

FOREIGN PATENT DOCUMENTS

EP    1 405 688 A2    4/2004

(Continued)

*Primary Examiner*—James Sells
(74) *Attorney, Agent, or Firm*—The Nath Law Group; Jerald L. Meyer; Robert T. Burns

(57) ABSTRACT

Horn assembly adapted to be rotatably arranged in a housing (3) of a rotary ultrasonic sealer, and comprising a hollow shaft (1) having a longitudinal axis (2) and a horn (8) arranged coaxially in the hollow shaft (1) and connected to a converter (6) and preferably also a booster (7). The horn (8) is provided with a peripheral sealing area (13) outside an axial end (13) of the hollow shaft (1). The horn (8) is connected to the hollow shaft (1) by means of at least one annular, metallic support (11) extending radially outward from an outer face (14) of the horn (8) and axially acting retaining means so as to fixedly retain the horn (8) in the hollow shaft (1). The at least one annular support (11) is corrugated in cross section such that at least two grooves and one ridge arranged there between are provided between the inner face (10) of the hollow shaft (1) and the outer face (14) of the horn (8). The at least one support (11) comprises at its outer circumference a conical surface (26) adapted to cooperate with a corresponding conical surface (27) for centering the support (11) with respect to the hollow shaft (1).

11 Claims, 8 Drawing Sheets

U.S. PATENT DOCUMENTS

| | | | |
|---|---|---|---|
| 5,486,733 A | | 1/1996 | Yamazaki et al. |
| 5,707,483 A | * | 1/1998 | Nayar et al. ............. 156/580.2 |
| 5,976,316 A | * | 11/1999 | Mlinar et al. ............ 156/580.2 |
| 5,994,818 A | | 11/1999 | Abramov et al. |
| 6,059,923 A | * | 5/2000 | Gopalakrishna ......... 156/580.2 |
| 6,547,903 B1 | | 4/2003 | McNichols et al. |
| 6,613,171 B2 | * | 9/2003 | McNichols et al. ........ 156/73.1 |
| 6,877,975 B2 | * | 4/2005 | Wuchinich ............... 425/174.2 |
| 6,966,969 B2 | * | 11/2005 | Moulin et al. ............ 156/580.2 |
| 2009/0032198 A1 | * | 2/2009 | Sorensen et al. ......... 156/580.2 |

FOREIGN PATENT DOCUMENTS

| | | |
|---|---|---|
| GB | 877966 | 9/1961 |
| WO | WO 01/53032 A1 | 7/2001 |
| WO | WO 2006/099872 A1 | 9/2006 |

\* cited by examiner

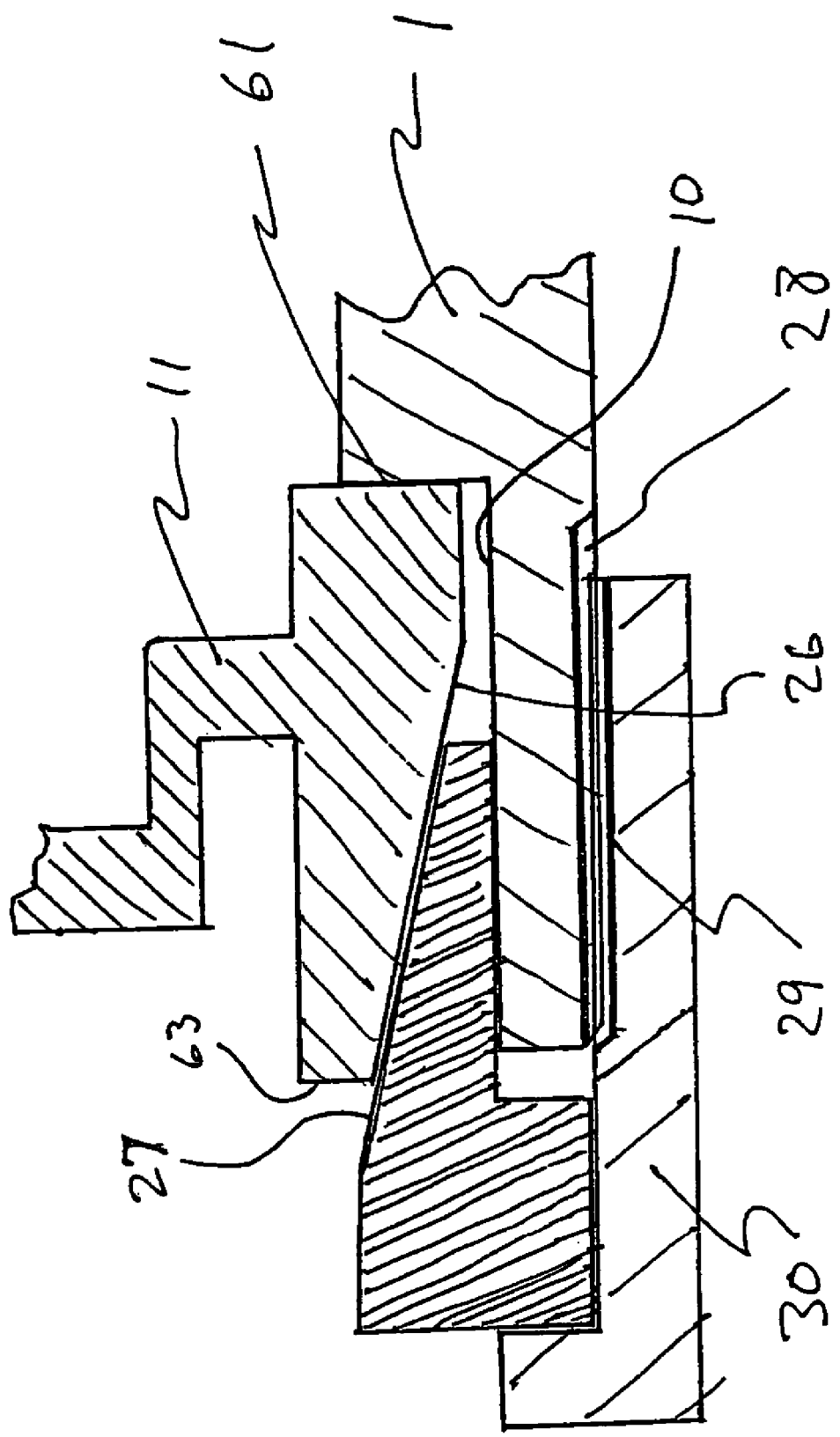

ROTARY ULTRASONIC SEALER

This application was filed under 35 U.S.C. 371 as a national stage of PCT/DK2007/000417, filed 26 Sep. 2007, an application claiming priority of Danish Application No.: 2006 01258, filed on 28 Sep. 2006, the entire content of which is hereby incorporated by reference in its entirety.

TECHNICAL FIELD

The claimed subject matter relates to a horn assembly adapted to be rotatably arranged in a housing of a rotary ultrasonic sealer, and comprising a hollow shaft having a longitudinal axis and a horn arranged coaxially in the hollow shaft and connected to a converter and preferably also a booster, the horn being provided with a peripheral sealing area outside an axially free end of the hollow shaft and the housing, and wherein the horn is connected to the hollow shaft by means of at least one annular, metallic support extending radially outward from an outer face of the horn and retaining means so as to fixedly retain the horn in the hollow shaft, said support being arranged essentially in a point with minimum vibration amplitude in the longitudinal direction of the horn, wherein the at least one annular support is corrugated in cross section such that at least two grooves and one ridge arranged there between are provided between the inner face of the hollow shaft and the outer face of the horn, the annular support comprising a first leg and a second leg being interconnected at first ends thereof via a top part and being provided a first bottom part and a second bottom part, respectively, at second ends opposite the first ends.

Further, the claimed subject matter relates to a rotary ultrasonic sealer.

BACKGROUND ART

Such a horn assembly for a rotary sealer is known from the co-pending international application PCT/DK2006/000163, which at the time of filing of the present application is not published.

Typically, in addition to the said one support the horn or the booster connected thereto is provided with a further support arranged a multiple of half a wavelength, e.g. half a wavelength of the applied vibrations, from the said one support and is thus arranged in a point with minimum vibration amplitude in the longitudinal direction. In these points with minimum vibration amplitude in the longitudinal direction, the radial displacement reaches its maximum or is close to reaching its maximum when the horn vibrates.

Furthermore, rotary sealers typically comprise an anvil, e.g. an anvil roller, being rotatable in opposite direction of the horn and having a peripheral face adjacent the sealing face of the sealing horn. The part(s) to be sealed—typically of a thermoplastic material—is/are inserted between the sealing face of the horn and the peripheral face of the anvil roller, sealing being provided due to the vibration of the sealing face of the horns and the pressure exerted between the sealing face and the peripheral face of the anvil roller.

As mentioned, maximum radial movements occur in the points with minimum vibration amplitude. Accordingly, it is vital that the supports are resilient. If the supports are not suitably resilient, a large amount of energy is transferred to the hollow shaft and the housing which otherwise would be utilized in the sealing process. Furthermore, increased mechanical wear arises between the supports and the hollow shaft, if the supports are not adequately resilient. As a result, the rotary sealer operates unevenly with reduced precision and reduced operating life. Additionally, an insufficiently resilient support will cause intense heating of the support areas and at worst may result in the supports being welded to the hollow shaft and/or the retaining means.

For sealing thick materials and/or sealing at high velocities, a substantial amount of energy, high amplitude and a comparatively high pressure between the sealing face of the rotating horn and the material to be sealed are required. The high radial pressures or, when sealing at high velocities, centrifugal forces acting on the slightest imbalance in the horn will result in a bending of the horn assembly. Further in order to obtain viable seals, the peripheral sealing area of the horn must rotate within tolerances better than a few micrometers Known rotary sealers do not allow for sealing under the above operating conditions without compromising the required precision and without large amounts of energy being dissipated in the hollow shaft and the housing resulting in energy loss and a risk of welding the support to the hollow shaft.

DESCRIPTION OF THE INVENTION

The object of the invention is thus to provide a rotary sealer of the above type remedying the above drawbacks of prior art.

The rotary sealer according to the invention is characterised in that the support at its periphery comprises a conical surface having a proximal end and a distal end, which conical surface is adapted to cooperate with a corresponding conical surface for centering the support with respect to the hollow shaft when the horn is retained in the hollow shaft by means of the retaining means.

During vibration of the horn, the radial displacement or expansion of the horn is absorbed by the annular support such that substantially no vibrations are transferred to the hollow shaft and the housing, and the loss of energy is minimised or eliminated. By providing the horn with a support a very accurate positioning of the horn is furthermore obtained resulting in optimum rotation thereof with no or a minimum of slack. This is in contrast to the situation where the horn is not supported but held by the booster which in turn is supported in the hollow shaft by a support. The latter solution causes problems in particular when servicing or repairing the rotary sealer at which it is often necessary to remove the horn from the booster. When remounting the horn on the booster it is practically impossible to remount the horn in exactly the same position as before, thereby causing slack in the sealing area.

Under load, such as during sealing operation, radial forces tend to bend the rotating horn away from the rotational axis of the hollow shaft. The conical outer surface allows centering the horn with respect to the cooperating surface so that it runs co-axially with the hollow shaft. The retaining means provide an axial force for pressing the conical outer surface of the annular support into tight engagement with the cooperating conical surface, thereby providing a precisely centred position of the horn and the peripheral sealing area thereof in relation to the hollow shaft with no or minimum slack.

According to the invention the circumference of the conical outer surface at the proximal end may be smaller than the circumference at the conical outer surface at the distal end and the cooperating conical surface is provided at the axially free end on the inner face of hollow shaft. The cooperating conical surface acts to centre the sealing horn with respect to the rotational axis of the hollow shaft. By providing the cooperating conical surface on the hollow shaft the conical outer surface of the annular support directly engages with the hollow shaft thus eliminating additional slack and tolerances.

According to another embodiment of the invention the circumference of the conical outer surface at the proximal end is larger than the circumference of the conical outer surface at the distal end and the cooperating conical surface is provided on an inner surface of the retaining means. The centering action of the cooperating conical surface is thus part of the axial retaining means and independent of the axial positioning of the sealing horn with respect to the hollow shaft.

Furthermore according to the invention a radially outer part of the support is formed as a separate cone ring having a radially inner face and being press-fitted, preferably by shrinking, onto a radially outer surface of a remainder part of the support. The separate cone ring allows for producing more complex shapes of the outer surface of the remainder part of the support, the inner surface of the cone ring and/or the outer conical surface.

In a further development of the above embodiment the separate cone ring is made from a different material than the remainder part of the support. Choosing a different material for the cone ring than for the sealing horn allows optimising the cone ring material with respect to its interaction with the cooperating surface and/or with the retaining means independent of the materials requirements for the sealing horn. The remainder part of the support and the cone ring can be made from for instance titanium, steel, aluminium or a copper alloy, such as bronze or brass. The cone ring can be made from the same materials or from cemented carbide or another suitable material.

Moreover according to the invention the radially outer face of the remainder part of the support may be provided with a plurality of mutually interspaced recesses, whereby abutment faces are formed between the recesses, said abutment faces abutting the inner face of the cone ring. By thus reducing the abutment area between the remainder part of the support and the inner face of the cone ring, the energy loss is further reduced, i.e. the energy being transferred to the hollow shaft and from there to the housing.

Moreover according to the invention the recesses may include axially extending recesses extending in the entire width of the support and preferably being arranged with the same mutual spacing in a circumferential direction. The recesses are preferably arranged with the same mutual interspacing, but may of course also be arranged with varying mutual interspacing. The number of such recesses are preferably at least three and most preferably at least eight. In practice excellent results have been obtained with forty-five recesses and forty-five corresponding abutment faces. The total area of the recesses constitutes preferably 30-90% and most preferably 40-80%, e.g. about 50-70% of the outer surface of the remainder part of the support. In practice a reduction in the energy loss of about 20-25% has thus been obtained by using forty-five axially extending and mutually interspaced recesses which jointly constitute about 60% of the total outer surface of the remainder part of the support.

Even though the above mentioned recesses are provided on the outer face of the remainder part of the support, alternatively the recesses may also be provided on the inner surface of the cone ring.

The conical outer face of the support may be provided with a plurality of mutually interspaced recesses and abutment faces being formed between the recesses, which abutment faces abut the cooperating conical surface.

Furthermore, according to the invention, in its top part and/or in its first bottom part and/or in its second bottom part the support may be provided with a number of axially through-going holes preferably arranged with the same mutual spacing in circumferential direction.

In a further embodiment according to the invention the through-going holes may be arranged substantially radially aligned with the abutment faces. The vibrations are thereby forced to bypass the holes and thus forced into the areas of the recesses not being in contact with the hollow shaft. Accordingly, a reduction in the transfer of energy to the hollow shaft and thus the housing is obtained. It should be noted that one or more holes may be provided for each abutment face.

Furthermore according to the invention the retaining means comprises a thread part with an inner thread adapted to cooperate with an outer thread on the hollow shaft, and a collar part detachably joined to the thread part. The collar part may be separated into a plurality of at least two parts, preferably cut along planes parallel to the longitudinal axis of the rotary sealer. For mounting the sealing horn, the thread part is placed on the hollow shaft, the conical outer surface of the support is placed in contact with its cooperating conical surface, the collar parts are arranged around the sealing horn and in the axial direction between the sealing surface and the annular support, the collar parts are joined by fastening means to the thread part to assemble the retaining means and finally the retaining means is tightened to bring the conical outer surface of the support into tight engagement with its cooperating conical surface According to the invention the annular support or the remainder part thereof may be formed integrally with the horn, whereby the first leg, the first bottom part and the outer face of the horn define a groove. By forming the support integrally with the horn any risk of the support being released from or displaced in relation to the horn during the operation of the rotary sealer is avoided, even at high vibration amplitudes. If high vibration amplitudes are not contemplated, it is, however, also possible to secure the support to the horn in another manner, e.g. by shrinking.

Furthermore according to the invention the annular support or the remainder part thereof may have a third leg extending from the second bottom part such that the third leg, the second bottom part and the second leg define a groove. The radially outer face of the third leg thus provides an increased abutment face with the inner face of the hollow shaft or with the inner face of the cone ring, respectively.

In a further development of the above embodiment, an elastomeric material, such as rubber, may be arranged in the groove. The elastomeric material effects an additional dampening or absorption of the vibrations transferred to the hollow shaft and thus to the housing.

Moreover according to the invention the first and second leg of the support may be mutually parallel and the bottom parts may be parallel to the top part. As a result, the corrugation of the annular support may include square waves.

In a further development of the above embodiment, the legs may be parallel to the inner face of the hollow shaft and the bottom part and the top part may be perpendicular to the inner face of the hollow shaft and the outer face of the horn.

Furthermore, the first and second legs of the annular support may be mutually convergent in a direction from the bottom parts to the top part such that the shape of the annular support includes triangular waves.

Both when the corrugated shape of the annular support includes square waves and when it includes triangular waves, a sharp corner may be provided between at least one leg and the upper and/or bottom part(s) associated therewith. Furthermore, the different legs and/or bottom and top parts of the support may be of different thicknesses and the individual legs may have varying thicknesses over their length, e.g. constant decreasing or increasing thickness.

Moreover, the different legs may be of different lengths and be varyingly mutually interspaced.

The at least one annular support is preferably arranged one quarter of a wavelength of the applied vibration from the cylindrical sealing face of the horn. The support is thereby advantageously arranged as close as possible to the sealing face of the horn and provides optimum support to the horn.

The rotary ultrasonic sealer may further include a booster coaxially connected to the horn and connected to the housing by means of an additional annular support which may be shaped as the at least one support of the horn. The booster support is preferably formed integrally with the booster and preferably arranged a multiple of half a wavelength, e.g. half a wavelength, from the at least one support of the horn.

The horn and an optional booster are made in known manner from for instance titanium, steel, aluminium or a copper alloy, such as bronze or brass.

BRIEF DESCRIPTION OF THE DRAWINGS

The invention is explained in detail below with reference to the drawings, in which

FIG. 17 shows a further embodiment of the retaining arrangement according to the invention.

BEST MODE(S) FOR CARRYING OUT THE INVENTION

Figure 1:
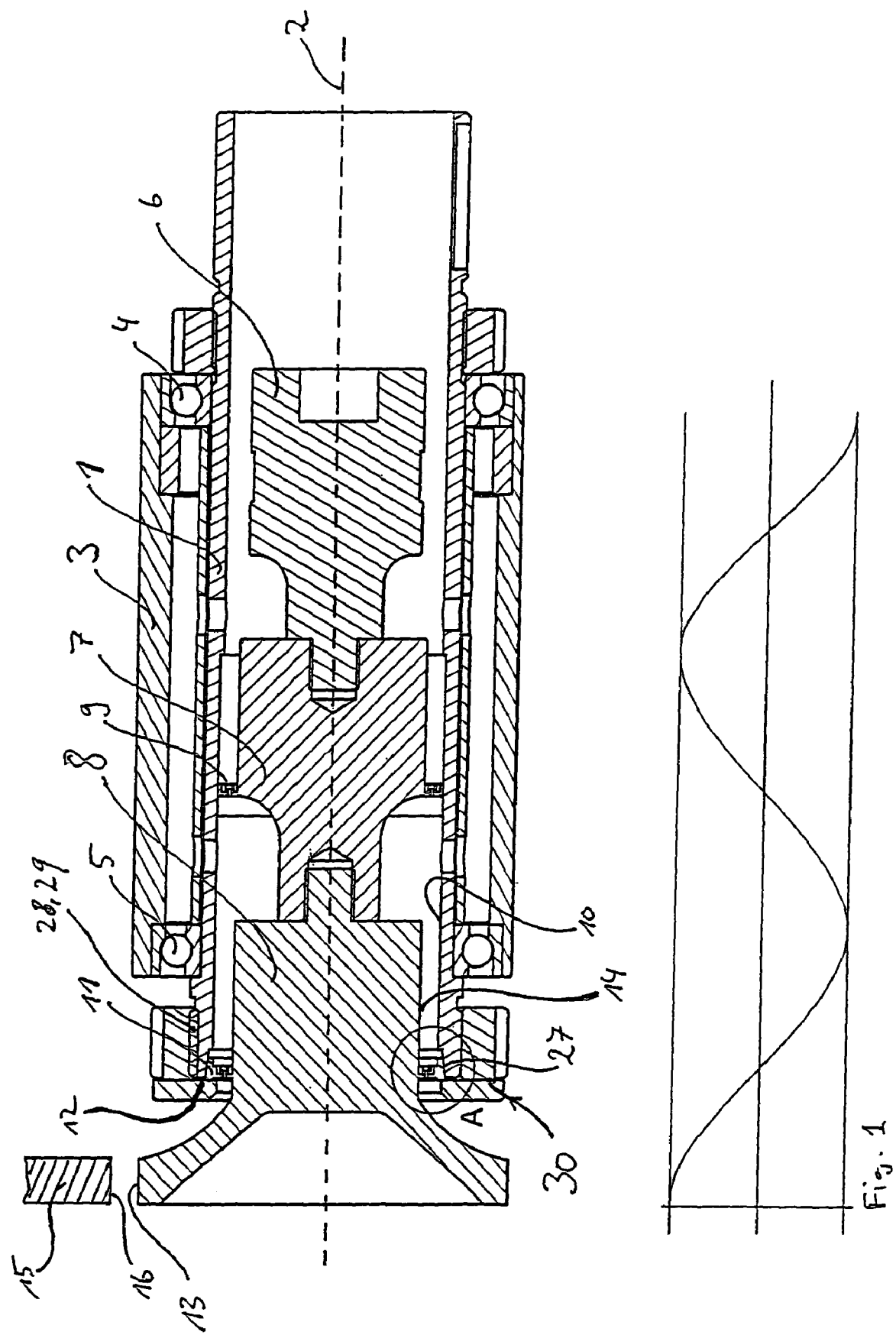
FIG. 1 is a sectional, diagrammatic view of a segment of a rotary sealer according to the invention, comprising a horn assembly according to the invention.

The rotary ultrasonic sealer according to the invention shown in a sectional view in FIG. 1 includes a hollow shaft 1 with a longitudinal axis 2. The hollow shaft 1 is rotatably arranged in a housing 3 by means of two mutually axially interspaced bearings 4, 5. By means of not-shown means the hollow shaft 1 may be made to rotate about its longitudinal axis 2.

An electro-acoustic converter 6 is arranged coaxially inside the hollow shaft 1 and connected to a not-shown generator and generating ultrasonic vibrations in the direction of the longitudinal axis 2. The converter 6 is connected coaxially to a booster 7, which is connected to an ultrasonic sealing horn 8. The booster increases the amplitude of the vibration applied by the converter 6 and transfers this to the horn 8.

The booster is connected with the inner face 10 of the hollow shaft 1 by means of a booster support 9 integrally formed with the booster. In a corresponding manner, the horn 8 is connected with the hollow shaft 1 by means of a horn support 11 integrally formed with the horn.

More specifically, the annular support 11 of horn 8 has a conical outer surface 26 abutting a cooperating conical seat surface 27 provided at the axial free end of the hollow shaft 1. A retaining means 30 is fastened to the hollow shaft 11 by means of an inner thread 29 on the retaining means 30 cooperating with an outer thread 28 on the hollow shaft 11. By tightening the retaining means 30 an axial force is exerted on the annular support by a collar part 30*b* of retaining means 30 acting on an outer rim of the annular support 11 at a distal end 63 thus bringing the conical outer surface 26 of the support 11 into tight engagement with the cooperating conical surface 27 on the axial free end 12 of hollow shaft 1.

The booster support 9 is arranged in a point with minimum vibration amplitude of the booster in the direction of the longitudinal axis 2. Correspondingly, the horn support 11 is arranged in a point with minimum vibration amplitude of the horn in the direction of the longitudinal axis, as shown at the bottom of FIG. 1. The booster support 9 and the horn support 11 are arranged with a mutual interspacing of an integral multiple of half a wavelength, and preferably with a mutual interspacing of half a wavelength, as shown at the bottom of FIG. 1.

The horn 8 extends out of an axial end 12 of the hollow shaft 1 and at its outer end is provided with a peripheral sealing area 13 having a diameter exceeding that of the outer face 14 of the horn at the horn support 11. The peripheral sealing area 13 is spaced apart by one quarter of a wavelength from the horn support 11, as shown at the bottom of FIG. 1.

As mentioned, the booster support 9 and the horn support 11 are arranged in points with minimum vibration amplitude in the direction of the longitudinal axis and thus in points in which the movement or expansion of the booster 7 and the horn 8, respectively, is at maximum. As the sealing face 13 of the horn 8 is arranged one quarter of a wavelength from the horn support 11, the sealing face is arranged in a point with maximum axial movement and thus minimum radial movement. Furthermore, FIG. 1 illustrates a portion of an anvil roller 15 being rotatable in opposite direction of the horn 8 and having a peripheral face 16 adjacent the sealing face 13 of the sealing horn 8.

Instead of the anvil roller 15 with the peripheral face 16, an additional sealing horn may be used, said horn being connected with a converter and optionally also a booster and having a circumferential-sealing area. By means of the thus provided rotary sealer with two horns allowing for sealing from both sides, very heavy materials may be sealed without the material being unduly compressed and displaced from the sealing zone.

Figure 2:
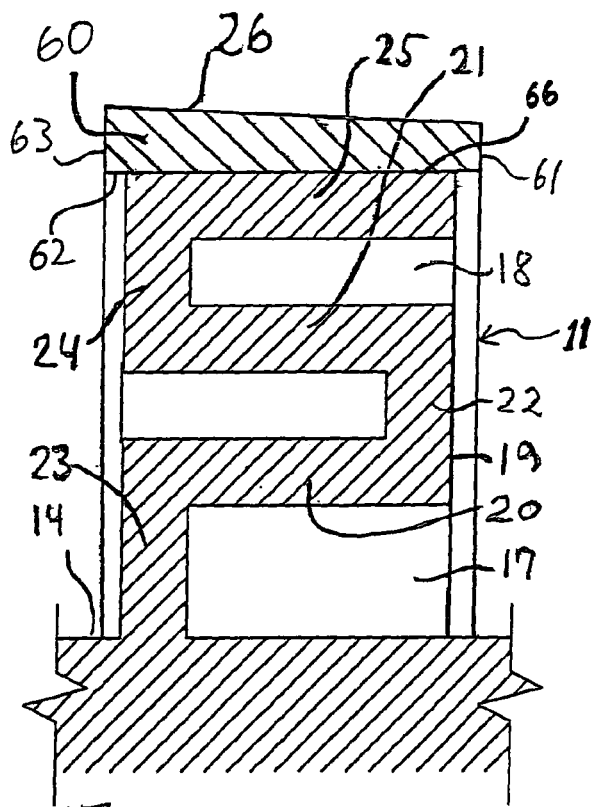
FIG. 2 shows the detail A in FIG. 1, said detail illustrating a first embodiment of an annular support.

Referring now to FIG. 2, a first embodiment of the horn support 11 is described in detail. At the same time, it should be noted that the booster support 9 may be shaped similarly to the horn support 11, why only the horn support 11 and possible examples of modifications and embodiments thereof are described below.

Figure 3:
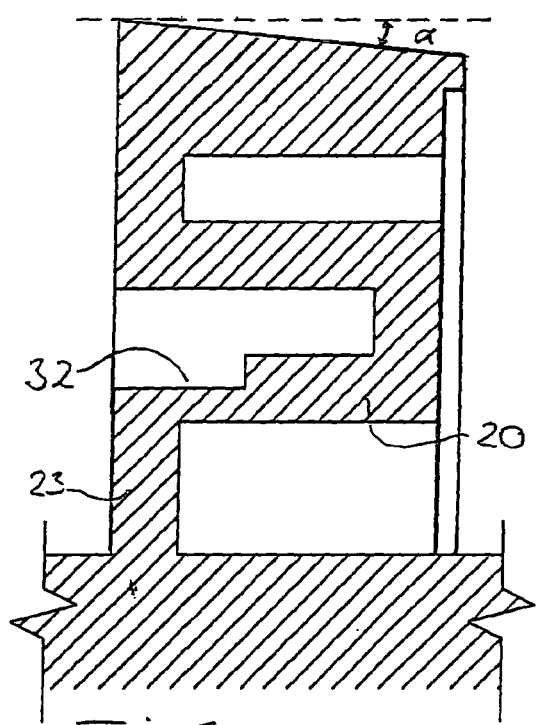
FIG. 3 is a sectional view of a first modification of the support shown in FIG. 2.
Figure 4:
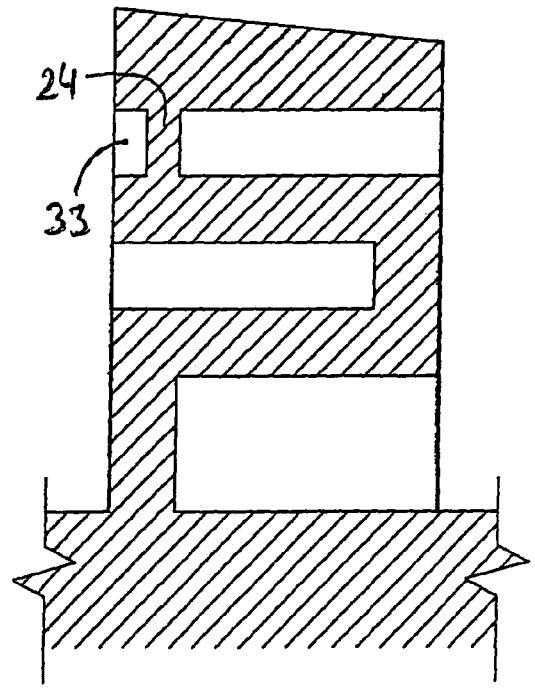
FIG. 4 shows a second modification of the support shown in FIG. 2.
Figure 5:
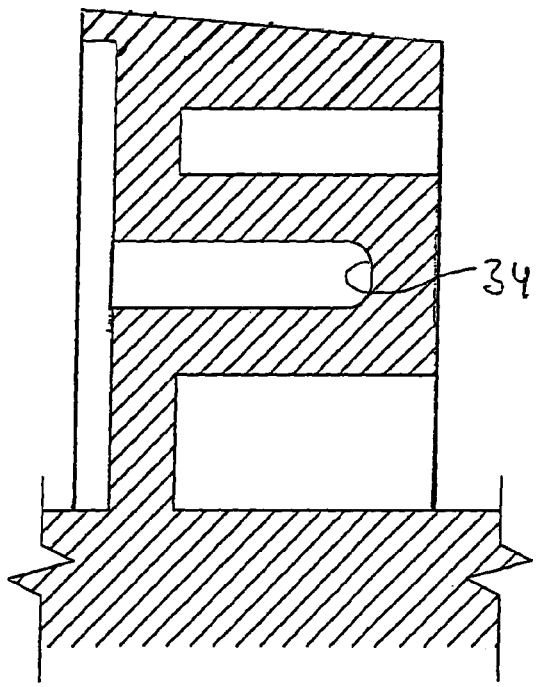
FIG. 5 shows a third modification of the support shown in FIG. 2.

The horn support 11 is annular and has a corrugated shape in cross section such that at least two grooves 17, 18 and one ridge 19 are provided between the inner face 10 of the hollow shaft 1. Specifically, the annular support 11 comprises a first leg 20 and a second leg 21 being mutually parallel and extending parallel to the outer face 14 of the horn 8 and the inner face 10 of the hollow shaft 1. At a first end of each leg 20, 21, the legs are interconnected via a top part being perpendicular to the legs, the outer face 14 of the horn 8 and the inner face 10 of the hollow shaft 1. At a second end of the first leg 20 opposite the first end, the support 11 has a first bottom part 23 extending parallel to the top part 22 at an axial distance therefrom and formed integrally with the outer face 14 of the horn 8. Thereby, the first leg 20, the first bottom part 23 and the outer face of the horn define the groove 17. At a second end of the second leg 21 opposite the first end, the support 11 has a second bottom part 24 extending radially aligned with the first bottom part 23. In its radially outer area the second bottom part 24 passes into a third leg 25 extending parallel to the first leg 20 and the second leg 21. A cone ring 60 having a conical outer surface 26 is press-fitted onto leg 25, preferably by shrinking, wherein a radially inner face 62 of the cone ring 60 abuts the radially outer surface 66 of leg 25. The conical outer surface 26 has a proximal end 61 and a distal end 63. As shown in FIG. 2, the cone ring 60 with conical outer surface 26 extends in an axial direction at its proximal end 61 beyond the outer plane defined by top part 22, and at its distal end 63 beyond the outer plane defined by the first bottom part 23 and by the second bottom part 24. As illustrated in FIGS. 3-5 the proximal end 61 and/or the distal end 63 of the conical outer surface 26 may be aligned with the outer planes defined by the top part 22 and the bottom parts 23, 24, respectively. The conical outer surface 26 abuts the cooperating conical surface 27 of hollow shaft and is held in retaining engagement with the hollow shaft 1, by means of a retaining means 30, as described above.

Preferably, the cone ring has a thickness measured in a radial direction from the inner surface 62 to the conical outer surface 26 of below 6 mm, more preferably between 0.5 mm and 4 mm and most preferably between 1 mm and 3 mm. In the axial direction the width of the cone ring 60 is preferably below 15 mm, more preferably between 2 mm and 10 mm and most preferably between 3 mm and 8 mm. The cone angle α between the conical surface 26 and the longitudinal axis 2 is preferably smaller than 25°, more preferably smaller than 18° and most preferably smaller than 15°.

FIG. 3 shows a modification of the support shown in FIG. 2, a recess 32 being formed in a transitional area between the first bottom part 23 and the first leg 20. The recess serves to expand the frequency range in which satisfactory sealing can be obtained.

With the same purpose, a recess 33 is provided in the second bottom part 24 in the modification shown in FIG. 4.

In the embodiments of the support 11 shown in FIGS. 1-4, all corners between the legs and the bottom parts are sharp-edged, shaped specifically as rectangular, sharp corners.

FIG. 5 shows a modification with a soft inner corner rounding 34.

Figure 6:
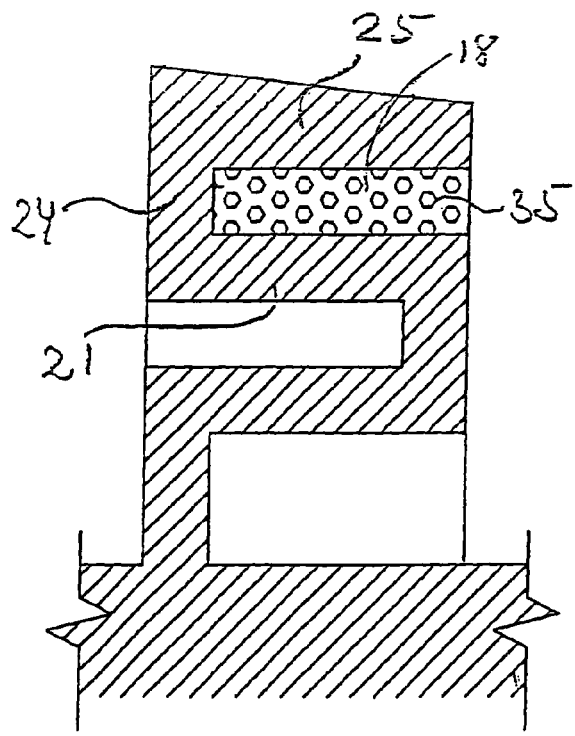
FIG. 6 shows a fourth modification of the support shown in FIG. 2.

In the modification shown in FIG. 6 an annular body 35 of an elastomeric material is provided in the groove 18 defined by the third leg 25, the second leg 21 and the second bottom part 24.

Figure 7:
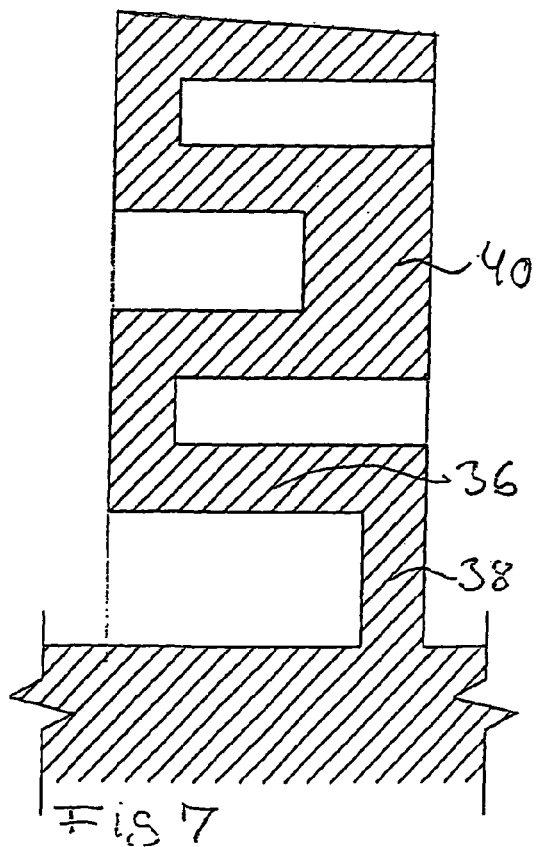
FIG. 7 shows a fifth modification of the support shown in FIG. 2.
Figure 8:
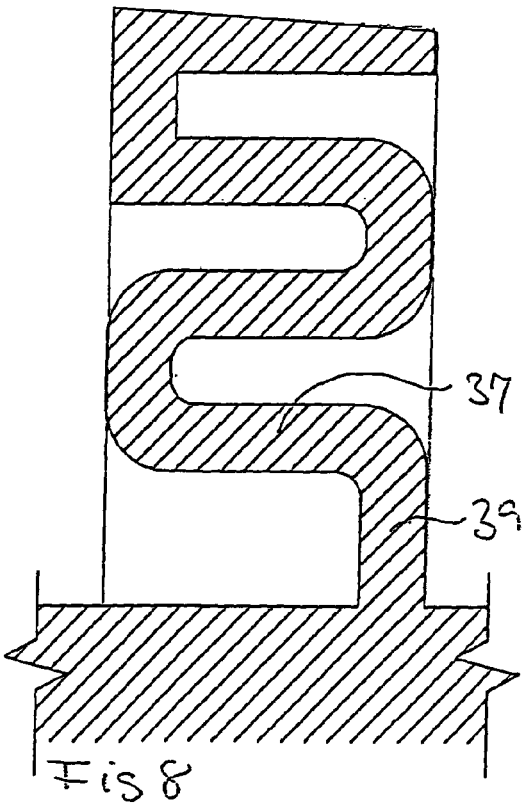
FIG. 8 shows a sixth modification of the support shown in FIG. 2.

FIGS. 7 and 8 show modifications of a horn support having an additional leg 36, 37, respectively, and an additional top part 38, 39, respectively. Moreover, the embodiment in FIG. 7 has increased wall thickness, ie. mass, in the area 40 for providing additional dampening.

FIG. 8 illustrates the use of both sharp-edged transitions and rounded transitions between legs and bottom and top parts.

Figure 9:
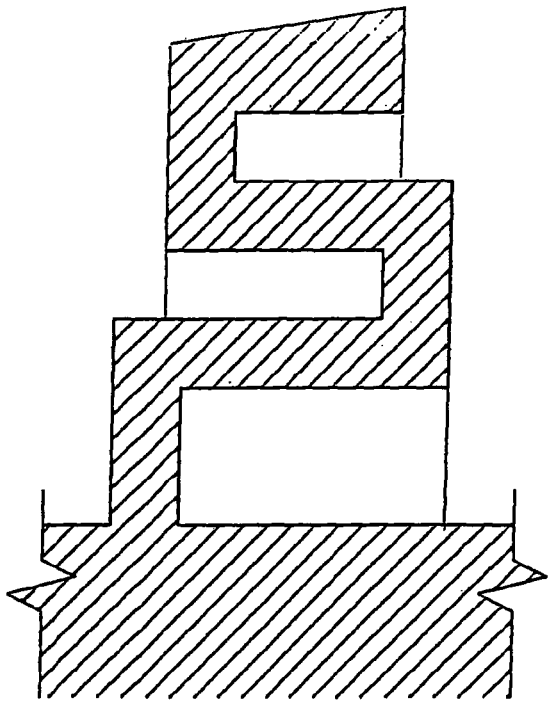
FIG. 9 shows a seventh modification of the support shown in FIG. 2.

FIG. 9 shows a modification in which the mutually parallel legs are of different lengths, the leg length decreasing radially outwardly. The leg length may, however, increase radially outwardly.

Figure 10:
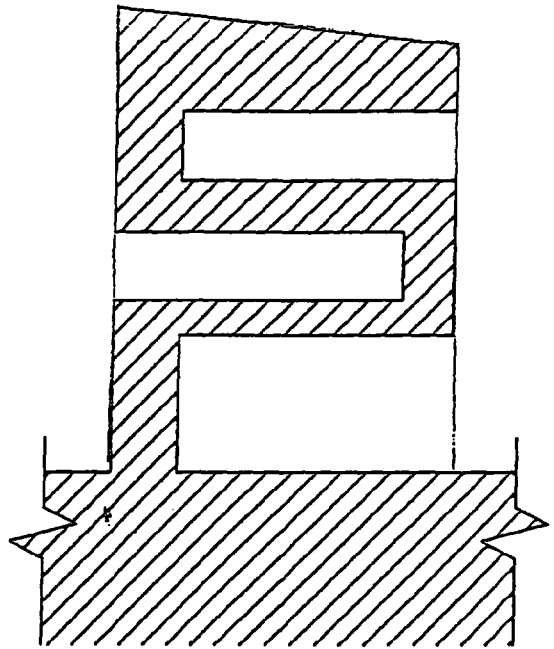
FIG. 10 shows an eighth modification of the support shown in FIG. 2.

FIG. 10 shows a modification in which the different legs have different thicknesses, whereby the radially inner leg has the smallest thickness and the radially outer leg has the largest thickness. The reverse situation, in which the legs have decreasing thicknesses radially outwardly, is, however, also possible.

Figure 11:
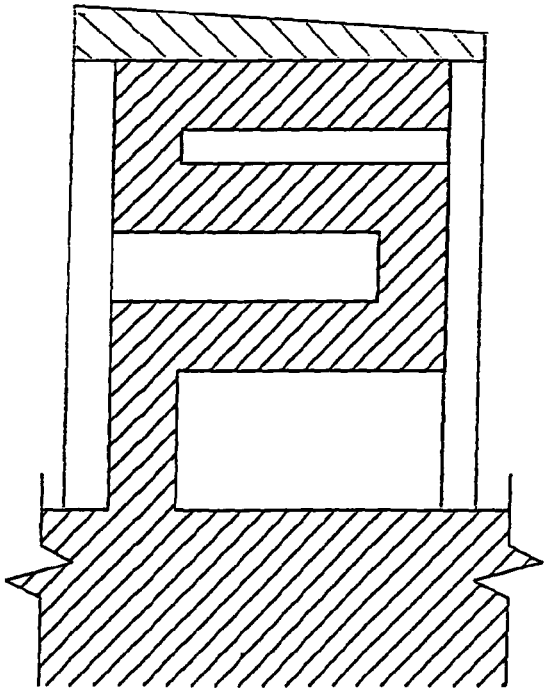
FIG. 11 shows a ninth modification of the support shown in FIG. 2.

FIG. 11 shows a modification in which the interspacing between the legs varies, whereby the interspacing between the different legs decreases seen radially outwardly. The leg spacing may also increase radially outwardly.

Figure 12:
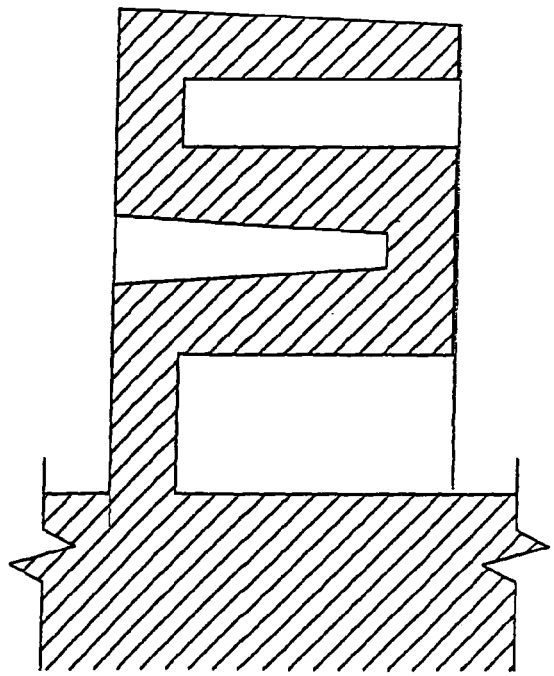
FIG. 12 shows a tenth modification of the support shown in FIG. 2.

FIG. 12 shows a modification in which two of the legs have decreasing thicknesses in the direction from the top part to the bottom parts.

Figure 13:
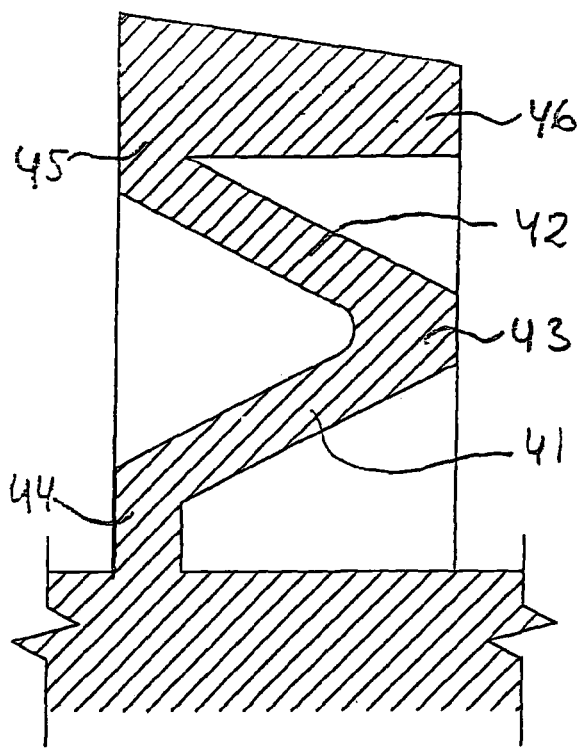
FIG. 13 shows a further embodiment of a support.

FIG. 13 shows an alternative embodiment of a horn support in which the first leg 41 and the second leg 42 extend convergently in the direction towards the top part 43. At its end opposite the top part 43 the first leg 42 passes into a bottom part 44 being connected with the outer face of the horn such that a groove is defined between the bottom part 44, the leg 41 and the outer face of the horn.

At its end opposite the top part 43 the second leg 42 passes into a second bottom part 45 from which a third leg 46 extends. The second leg 42 and the third leg 46 thus define a groove.

Figure 14:
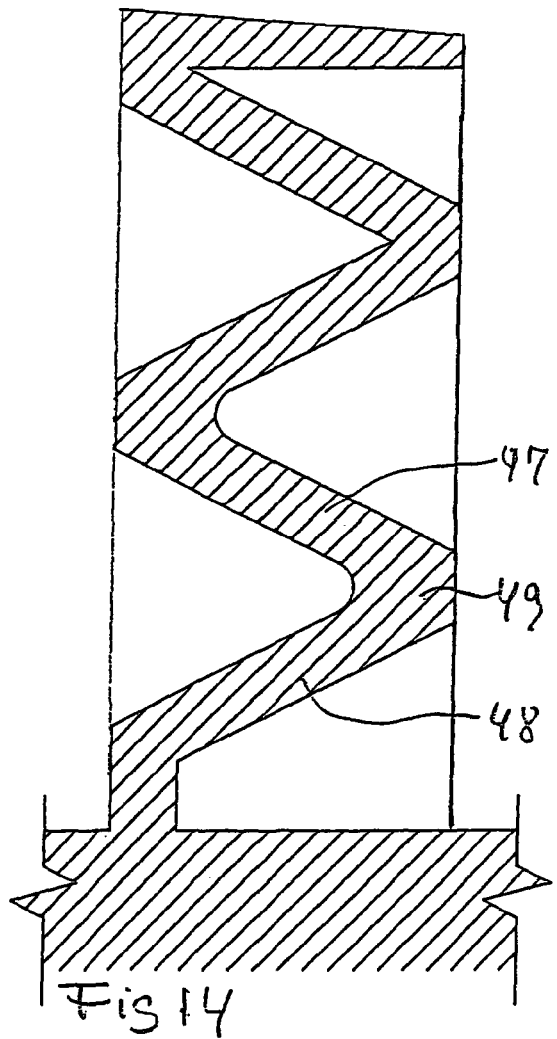
FIG. 14 shows a modification of the support shown in FIG. 13.

FIG. 14 shows a modification of the support shown in FIG. 13 comprising two additional legs 47, 48 converging in direction towards an additional top part 49.

Figure 15:
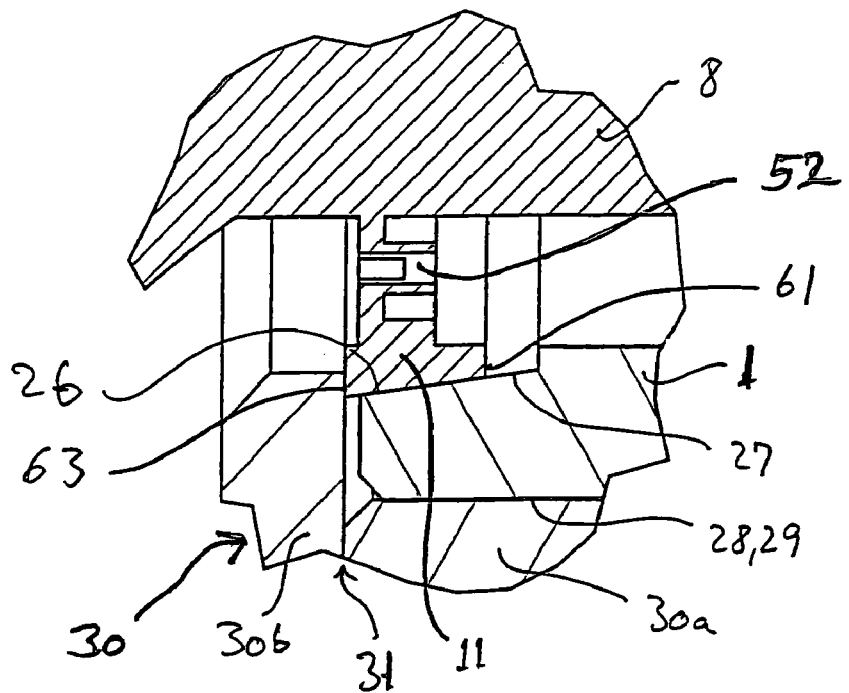
FIG. 15 shows the detail A in FIG. 1, said detail illustrating a first arrangement a hollow shaft, an annular support, and retaining means.

FIG. 15 shows detail A of FIG. 1 the annular support 11 being integrally formed with horn 8 and comprising a corrugated inner part with holes 52 and a conical outer part with a conical outer surface 26.

Figure 16:
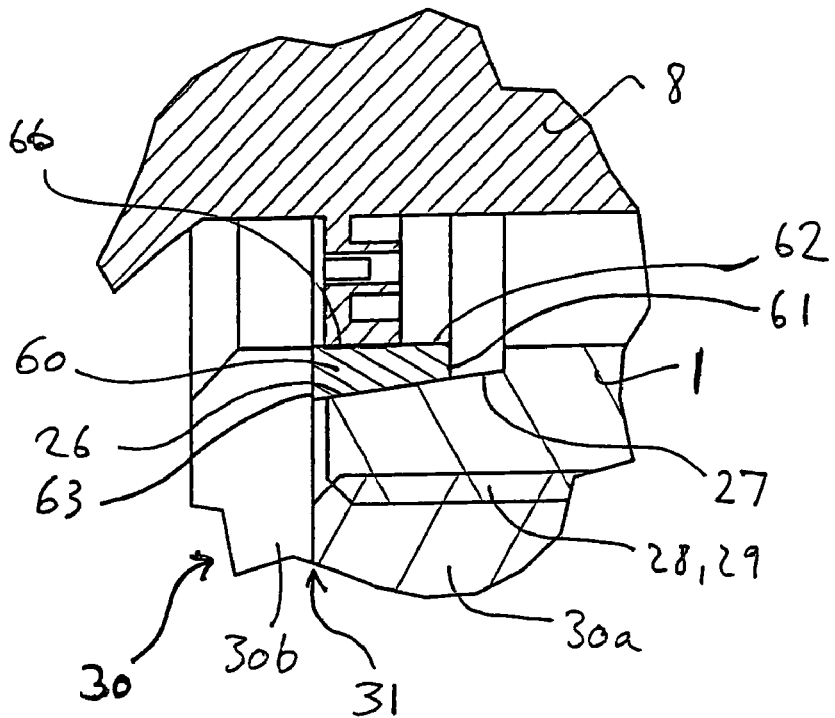
FIG. 16 shows the detail A in FIG. 1, said detail illustrating a second arrangement a hollow shaft, an annular support, and retaining means.

FIG. 16 shows detail A of FIG. 1 the annular support 11 consisting of an outer cone ring 60 with a conical outer surface 26 and a corrugated remainder part that is integrally formed with the horn 8. The cone ring 60 is preferably shrunk-fit onto the remainder part of the support.

FIG. 15 and FIG. 16 illustrate the arrangement for retaining the annular support in the hollow shaft 1.

A retaining means 30 comprises a collar part 30b divided into at least two subparts detachably connected to a thread part 30a with an inner thread 29. The collar part 30b has an internal diameter that is larger than the outer diameter of the horn 8 adjacent to the support 11 and that is smaller than the outer diameter of the annular support 11. In order to place the retaining means such that the collar part 30b abuts the side of the annular support that faces towards the peripheral sealing area 16 (distal face), the collar part 30b is detached from the thread part 30a of retaining means 30 at a connection plane 31, separated into the subparts that can be arranged around the sealing horn 8 and finally again joined to the thread part 30a, e.g. by means of screws. It should be noted that alternatively the retaining means may be cut along a plane parallel to the longitudinal axis 2 and assembled around the sealing horn by means of transverse fastening means.

By tightening the retaining means 30 onto the outer thread 28 on the hollow shaft 1 the collar part 30b exerts an axial retaining force on the distal face of the annular support 11 so as to centrally position and retain the horn in the hollow shaft.

FIG. 17 shows an alternative embodiment of the retaining arrangement according to the invention. The annular support 11 has a conical part with a conical outer surface that is tapered towards the distal end 63. In this embodiment the proximal end of the conical part the support 11 abuts a seat plane on the axial free end 12 of the hollow shaft 1 that is perpendicular to the longitudinal axis 2. An additional centering ring 64 that is divided into at least two subparts is inserted between the cone ring 60 and an inner face 10 of the hollow shaft 1 thus providing the cooperating conical surface 27. By tightening the retaining means 30 with the inner thread 29 onto the outer thread 28 on the hollow shaft 1 the collar part 30b exerts an axial retaining force via the centering ring 64 on the conical outer surface 26 of the annular support 11 so as to centrally position and retain the horn in the hollow shaft.

Figure 20:
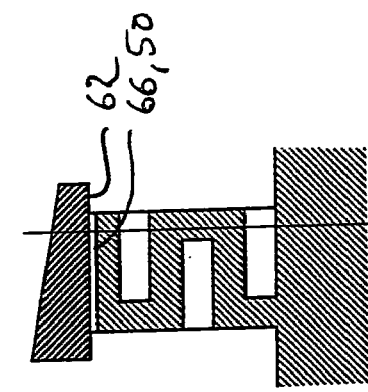
FIG. 20 is an axial sectional view along the line II-II of the support shown in FIG. 18.
Figure 19:
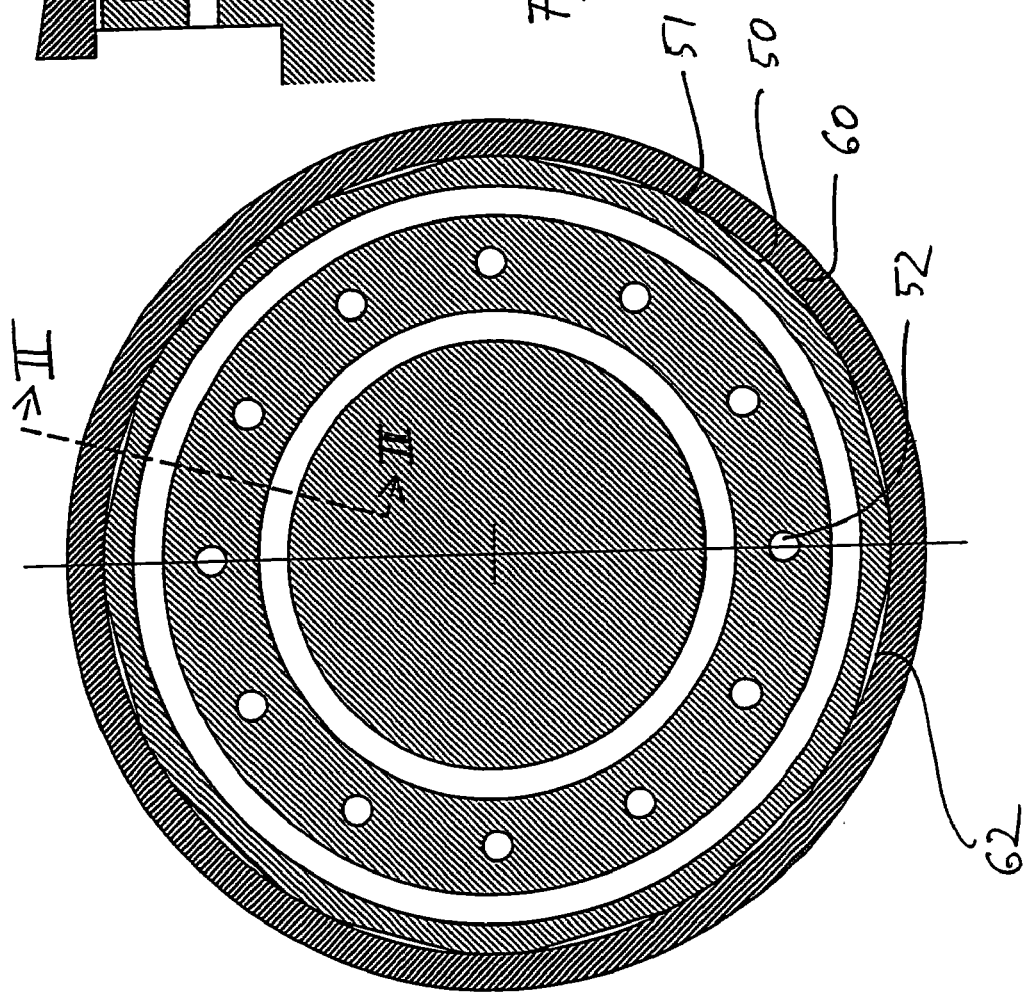
FIG. 19 is a radially sectional view along the line I-I of the support shown in FIG. 17.
Figure 18:
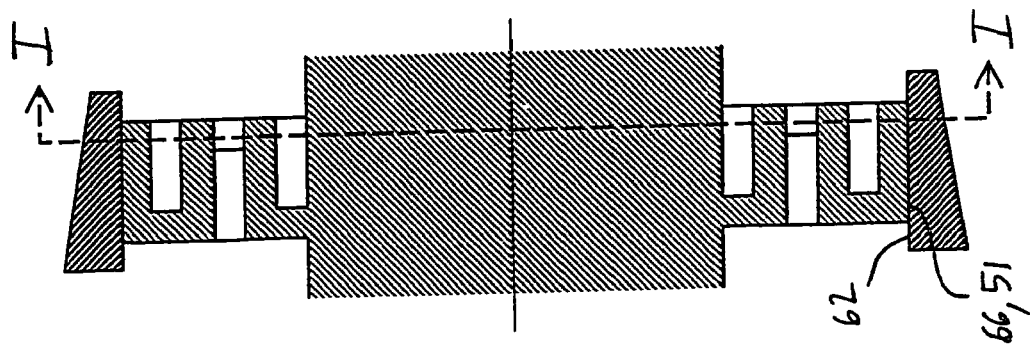
FIG. 18 is an axial sectional view through a further embodiment of a support.

FIGS. 18, 19 and 20 show an axial, a radial and a further axial section, respectively, through an alternative embodiment of a horn support. The horn support corresponds substantially to the horn support shown in FIG. 2, why only the differences are described in detail.

The horn support 11 comprises a cone ring 60 which is shrunk-fit onto a remainder part of the horn support 11. The radially outer face 66 of the horn support 11 is provided with a plurality of recesses 50. In the shown embodiment twelve recesses are provided with the same mutual spacing in circumferential direction. Abutment faces 51 defined between the recesses abut the inner face 10 (not shown in FIGS. 18-20) of the hollow shaft 1. Thus, twelve abutment faces 51 are also provided with the same mutual spacing in the circumferential direction. In the shown embodiment, the recesses 50 are plane and formed by machining of the cylindrical face 66 of the support. It should further be noted that the recesses 50 extend axially in the entire width of the support. It should also be noted that for purely illustrative reasons twelve recesses and abutment faces are shown. In practice, the number of recesses and abutment faces are often higher. As previously mentioned, in practice excellent results have been obtained with forty-five recesses and abutment faces.

It should be noted that the conical outer surface of the cone ring also may be provided with recesses and abutment faces abutting the cooperating conical surface of the hollow shaft.

The support shown in FIGS. 18-20 is also provided with a plurality of axially through-going holes 52 in the bottom part 22. The holes 52 are arranged with the same mutual spacing in circumferential direction. In a radial direction the holes 52 are aligned with the abutment faces 51. In the present example twelve holes 52 are also provided. As it appears from FIG. 15, the holes 52 each has a diameter corresponding substantially to the spacing between the first leg 20 and second leg 21 of the support.

In the embodiments described above, the annular support is formed integrally with the horn. It should, however, be understood that the support may also be produced as a separate part which is secured to the horn, e.g. by shrinking, in particular if the horn is not to vibrate with high vibration amplitudes. In this case it is preferred to secure the support to the horn via a leg so as to obtain a large abutment face.

It should also be noted that the bottom parts, top parts and legs of the annular support are comparatively thin-walled and have a thickness of below 3 mm, preferably a thickness between 0.4 and 2 mm, more preferably between 0.5 and 1.5 mm and most preferably a wall thickness between 0.6 and 1.2 mm. The spacing between the legs are preferably also between about 0.4 and 2 mm, preferably between 0.5 and 1.5 mm and most preferably between about 0.6 and 1.2 mm. The axial length of the annular support is preferably also comparatively small, preferably less than 10 mm, more preferably less than 5 mm and most preferably between 1.5 and 4 mm.

Finally it should be noted that the support does not necessarily have to be connected to the conical surface of the hollow shaft via a leg as in the shown examples, but the connection may also be provided via an upper or bottom part provided with a conical outer surface.

LIST OF REFERENCE NUMERALS

1 Hollow shaft
2 Longitudinal axis
3 Housing
4, 5 Bearings
6 Converter
7 Booster
8 Sealing horn
9 Booster support
10 Inner face
11 Horn support
12 Axial end of hollow shaft
13 Peripheral sealing area
14 Outer face of the horn
15 Anvil roller
16 Peripheral face
17 Groove
18 Groove
19 Upper end
20 First leg
21 Second leg
22 Top part
23 First bottom part
24 Second bottom part
25 Third leg
26 Conical outer face
27 Cooperating conical surface
28 Outer thread
29 Inner thread
30 Retaining means
30a Thread part
30b Collar part
31 Connection plane
32 Recess
33 Recess
34 Soft inner corner
35 Body of an elastomeric material
36, 37 Additional legs
38, 39 Additional top part
40 Increased wall thickness
41 First leg
42 Second leg
43 Top part
44 First bottom part
45 Second bottom part
46 Third leg
47, 48 Additional leg
49 Additional top part
50 Recesses
51 Abutment faces
52 Holes
60 Cone ring 61 Proximal end
62 Inner face
63 Distal end
66 Outer surface
α Cone angle

The invention claimed is:

1. Horn assembly adapted to be rotatably arranged in a housing (3) of a rotary ultrasonic sealer, and comprising a hollow shaft (1) having a longitudinal axis (2) and a horn (8) arranged coaxially in the hollow shaft (1) and connected to a converter (6) and preferably also a booster (7), the horn (8) being provided with a peripheral sealing area (13) outside an axially free end (12) of the hollow shaft (1) and the housing (3), and wherein the horn (8) is connected to the hollow shaft (1) by means of at least one annular, metallic support (11) extending radially outward from an outer face (14) of the horn (8) and retaining means so as to fixedly retain the horn (8) in the hollow shaft (1), said support (11) being arranged essentially in a point with minimum vibration amplitude in the longitudinal direction of the horn, wherein the at least one annular support (11) is corrugated in cross section such that at least two grooves (17, 18) and one ridge (19) arranged there between are provided between the inner face (10) of the hollow shaft (1) and the outer face (14) of the horn (8), the annular support (11) comprising a first leg (20) and a second leg (21) being interconnected at first ends thereof via a top part (22) and being provided a first bottom part (23) and a second bottom part (24), respectively, at second ends opposite the first ends, characterised in that the support (11) at its periphery comprises a conical surface (26) having a proximal end (61) and a distal end (63), which conical surface (26) is adapted to cooperate with a corresponding conical surface (27) for centering the support (11) with respect to the hollow shaft (1), when the horn (8) is retained in the hollow shaft (1) by means of the retaining means (30).

2. A horn assembly according to claim 1, characterised in that the circumference of the conical outer surface (26) at the proximal end (61) is smaller than the circumference at the conical outer surface (26) at the distal end (63) and the cooperating conical surface (27) is provided at the axially free end (12) on the inner face (10) of hollow shaft (1).

3. A horn assembly according to claim 1, characterised in that the circumference of the conical outer surface (26) at the proximal end (61) is larger than the circumference of the conical outer surface (26) at the distal end (63) and the cooperating conical surface (27) is provided on an inner surface of the retaining means (30).

4. A horn assembly according to claim 1, characterised in that a radially outer part of the support is formed as a separate cone ring (60) having a radially inner face (62) and being press-fitted, preferably by shrinking, onto a radially outer surface (66) of a remainder part of the support (11).

5. A horn assembly according to claim 4, characterised in that the separate cone ring (60) is made from a different material than the remainder part of the support (11).

6. A horn assembly according to claim 4, characterised in that the radially outer face (66) of the remainder part of support (11) is provided with a plurality of mutually interspaced recesses (50), and abutment faces (51) being formed between the recesses (50), which abutment faces abut the inner face (62) of the cone ring (60).

7. A horn assembly according to claim 6, characterised in that the recesses (50) include axially extending recesses extending in the entire width of the support (11) and preferably being arranged with the same mutual spacing in circumferential direction.

8. A horn assembly according to claim 1, characterised in that in its top part (22) and/or in its first bottom part (23) and/or in its second bottom part (24) the support is provided with a number of axially through-going holes (52) preferably arranged with the same mutual spacing in circumferential direction.

9. A horn assembly according to claim 1, characterised in that the retaining means comprises a thread part (30*a*) with an inner thread (29) adapted to cooperate with an outer thread (28) on the hollow shaft (10), and a collar part (30*b*) detachably joined to the thread part (30*a*).

10. A horn assembly according to claim 1, characterised in that the annular support (11) or the remainder part thereof is formed integrally with the horn (8), whereby the first leg (20), the first bottom part (23) and the outer face (14) of the horn define a groove (17).

11. A rotary ultrasonic sealer comprising a horn assembly according to claim 1 being arranged in a housing (3) of the sealer for driven rotation about the longitudinal axis (2) of the hollow shaft (1) of the horn assembly.

* * * * *